United States Patent
Patel et al.

(10) Patent No.: US 12,495,051 B2
(45) Date of Patent: Dec. 9, 2025

(54) SERVICE LEVEL VERIFICATION IN DISTRIBUTED SYSTEM

(71) Applicant: Dell Products L.P., Round Rock, TX (US)

(72) Inventors: Dharmesh M. Patel, Round Rock, TX (US); John A. Lockman, III, Granite Shoals, TX (US)

(73) Assignee: Dell Products L.P., Round Rock, TX (US)

( * ) Notice: Subject to any disclaimer, the term of this patent is extended or adjusted under 35 U.S.C. 154(b) by 285 days.

(21) Appl. No.: 18/478,237

(22) Filed: Sep. 29, 2023

(65) Prior Publication Data
US 2025/0112937 A1  Apr. 3, 2025

(51) Int. Cl.
  *H04L 9/40* (2022.01)
  *H04L 41/0816* (2022.01)
  *H04L 41/50* (2022.01)

(52) U.S. Cl.
  CPC ...... *H04L 63/1416* (2013.01); *H04L 41/0816* (2013.01); *H04L 41/5032* (2013.01)

(58) Field of Classification Search
  CPC ............. H04L 63/1416; H04L 41/0816; H04L 41/5032
  USPC ......................................................... 726/22
  See application file for complete search history.

(56) References Cited

U.S. PATENT DOCUMENTS

| | | | |
|---|---|---|---|
| 6,192,402 B1 | 2/2001 | Iwase | |
| 7,890,612 B2 | 2/2011 | Todd | |
| 8,189,486 B2 | 5/2012 | Krishnaswamy | |
| 8,696,765 B2 | 4/2014 | Mendez | |
| 8,850,507 B2 | 9/2014 | Reisman | |
| 9,294,386 B2 | 3/2016 | Narad | |
| 9,354,126 B2 | 5/2016 | Chainer et al. | |
| 9,534,967 B2 | 1/2017 | Chainer et al. | |
| 10,652,038 B2 | 5/2020 | Juneau | |
| 10,764,143 B2 | 9/2020 | Huang | |
| 10,885,191 B1 | 1/2021 | Gupta | |

(Continued)

OTHER PUBLICATIONS

"Management vs. Control vs. Data Planes in a Network Device," Codilime, Dec. 22, 2022, Web Page <https://codilime.com/blog/management-plane-vs-control-plane-vs-data-plane/> accessed on Sep. 28, 2023 (8 Pages).

(Continued)

*Primary Examiner* — Lan Dai T Truong
(74) *Attorney, Agent, or Firm* — WOMBLE BOND DICKINSON (US) LLP

(57) ABSTRACT

Methods and systems for managing the operation of a deployment are provided. The deployment may be managed in accordance with a subscription model. The subscription model may use subscriptions to define the extent and limits on use of services provided by the deployment. The subscription services and limits may be enforced by management controllers of network devices of the deployment. The management controllers may operate independently from control planes and data planes of the network devices. If a plane is suspected of being compromised, the management controllers may take action to confirm the suspicions. Test may be performed, and measurements may be taken to confirm whether a plane is compromised. If confirmed, then remedial activity may be initiated to address the compromised plane.

20 Claims, 11 Drawing Sheets

(56) References Cited

U.S. PATENT DOCUMENTS

| | | | |
|---|---|---|---|
| 11,095,558 | B2 | 8/2021 | Cheng et al. |
| 11,444,838 | B2 | 9/2022 | Pieczul |
| 11,630,747 | B1 | 4/2023 | Deboy et al. |
| 11,770,309 | B2 | 9/2023 | Paruchuri |
| 11,888,739 | B2 * | 1/2024 | Mehmedagic ...... H04L 41/0806 |
| 11,924,680 | B2 | 3/2024 | Karampatsis |
| 11,962,506 | B2 | 4/2024 | Rangel Augusto et al. |
| 12,088,465 | B2 | 9/2024 | Subrahmanya |
| 12,113,669 | B1 | 10/2024 | Patel |
| 2007/0143827 | A1 | 6/2007 | Nicodemus |
| 2010/0188975 | A1 | 7/2010 | Raleigh |
| 2011/0128844 | A1 | 6/2011 | Sun |
| 2011/0275377 | A1 | 11/2011 | Wu |
| 2012/0114331 | A1 | 5/2012 | Kamijo et al. |
| 2015/0311961 | A1 | 10/2015 | Li |
| 2016/0328349 | A1 | 11/2016 | Kunnathur Ragupathi |
| 2018/0359134 | A1 | 12/2018 | Pech |
| 2020/0014583 | A1 | 1/2020 | Dang |
| 2020/0403889 | A1 | 12/2020 | Nguyen |
| 2021/0117249 | A1 | 4/2021 | Doshi et al. |
| 2021/0263836 | A1 | 8/2021 | Singh |
| 2021/0368395 | A1 | 11/2021 | Prabhakar |
| 2023/0156527 | A1 | 5/2023 | Zhang |
| 2023/0164567 | A1 | 5/2023 | Fellows |
| 2023/0267198 | A1 | 8/2023 | Karpovsky et al. |
| 2024/0080704 | A1 | 3/2024 | Feder |
| 2024/0205226 | A1 | 6/2024 | Lukyanov et al. |
| 2024/0323087 | A1 | 9/2024 | Koyfman |
| 2024/0380767 | A1 | 11/2024 | Davraev |
| 2024/0414574 | A1 | 12/2024 | Alworth |
| 2025/0112942 | A1 | 4/2025 | Patel |
| 2025/0112943 | A1 | 4/2025 | Patel |
| 2025/0112951 | A1 | 4/2025 | Patel |

OTHER PUBLICATIONS

"Control Plane Policing," Cisco Systems, Inc., Nov. 2006 (36 Pages).

Strickx, Tom, "ASICs at the Edge," The Cloudflare Blog, Nov. 27, 2020, web page <https://blog.cloudflare.com/asics-at-the-edge/> accessed on Sep. 28, 2023 (22 Pages).

Cotroneo, Domenico, et al., "Overload control for virtual network functions under CPU contention," Future Generation Computer Systems 99 (2019): 164-176 (13 Pages).

* cited by examiner

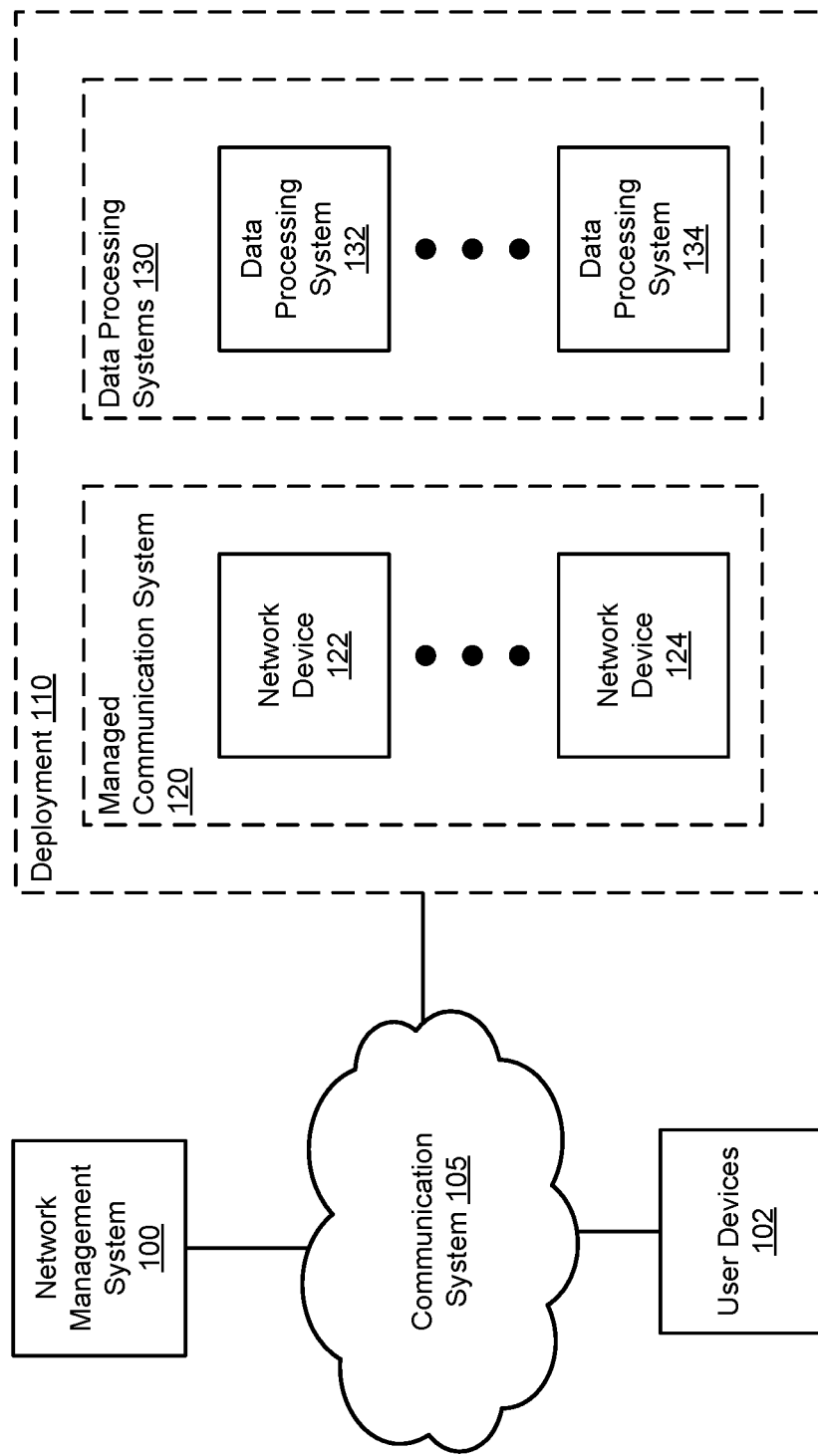

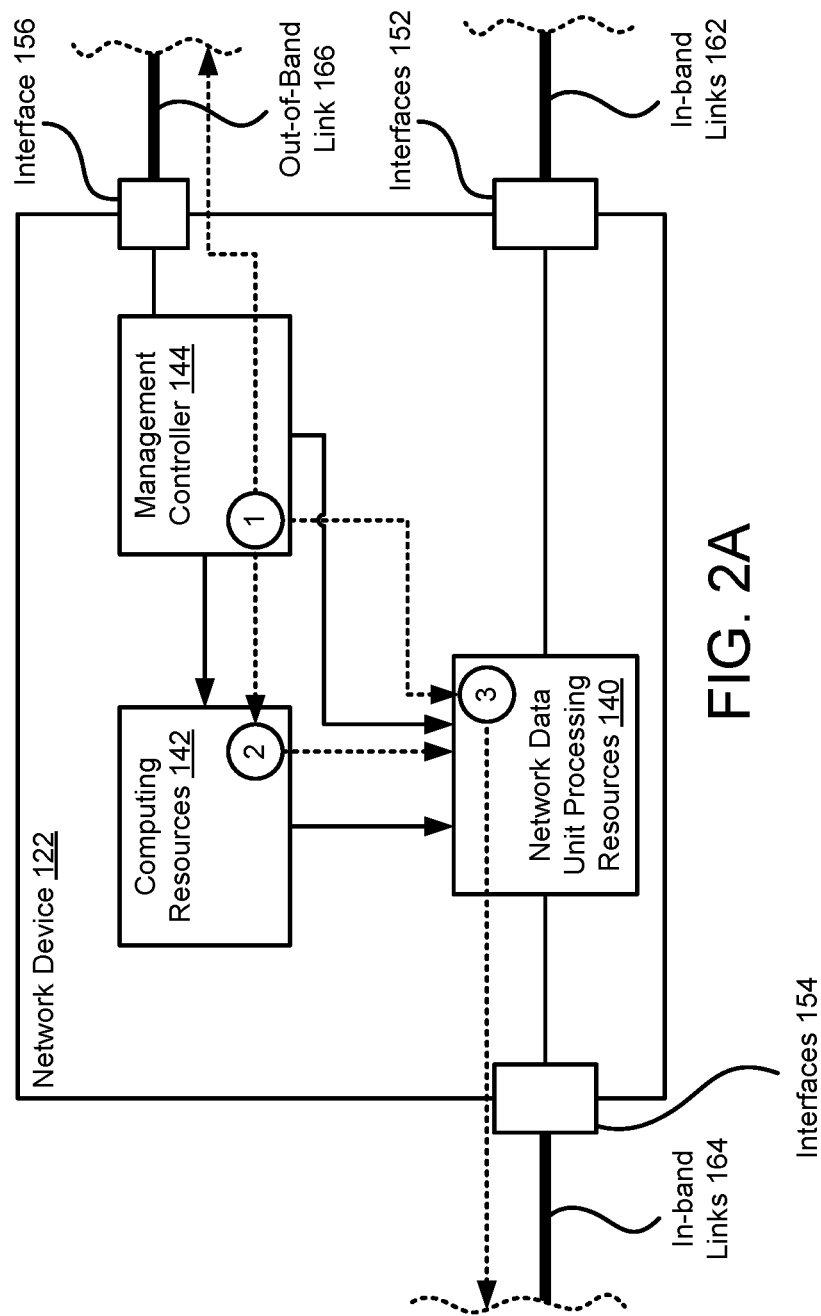

SERVICE LEVEL VERIFICATION IN DISTRIBUTED SYSTEM

FIELD

Embodiments disclosed herein relate generally to device management. More particularly, embodiments disclosed herein relate to systems and methods to manage devices in distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

FIGS. 2A-2D show data flow diagrams illustrating data flows and data processing in accordance with an embodiment.

DETAILED DESCRIPTION

Figure 1B:
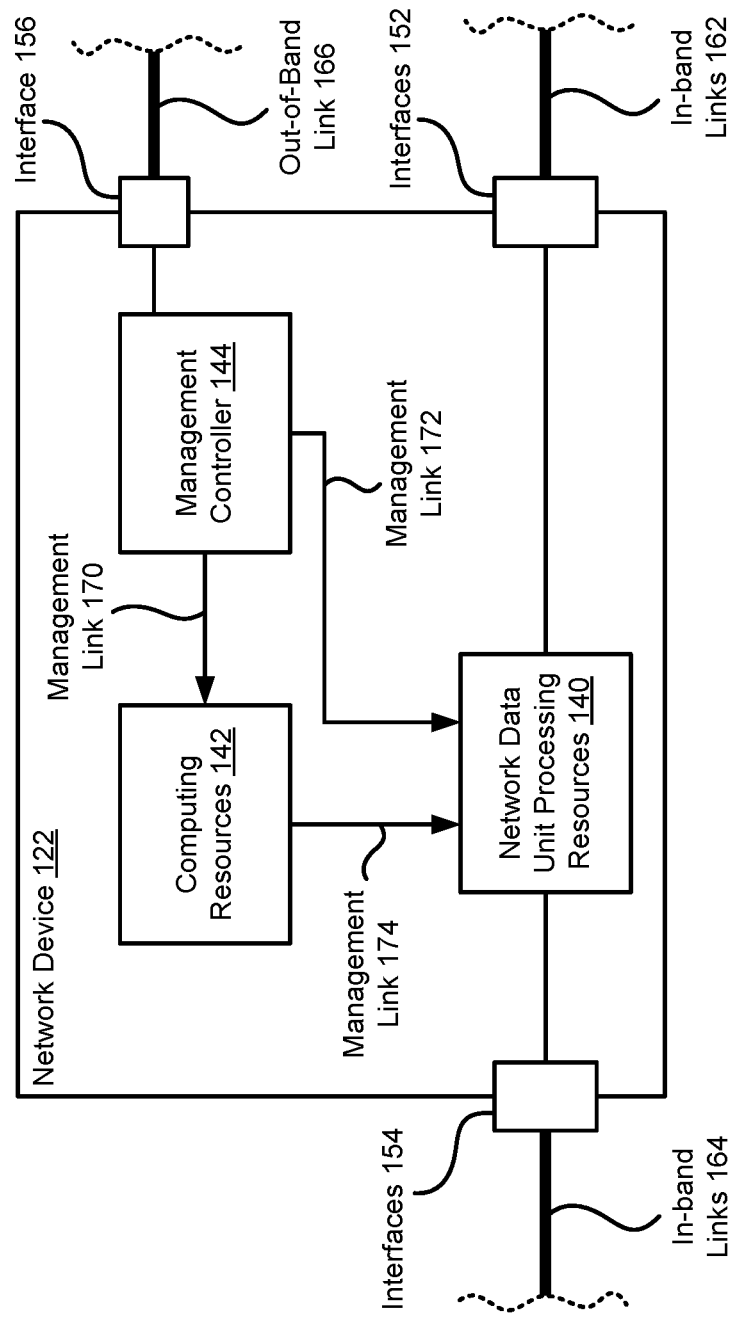
FIG. 1B shows a block diagram illustrating a network device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, any number of data processing systems may be operably connected by network devices that facilitate communications used in the computer implemented services.

The configuration of the network devices may impact the ability of the data processing systems to communicate with each other. To reduce the likelihood of the network devices being undesirably configured, the network devices may be part of a managed communication system. The managed communication system may be externally managed and configured.

To facilitate configuration of the managed communication system in a desired manner, information regarding desired outcomes with respect to services provided by the managed communication system may be obtained. The information may be used to configure the network devices.

To govern the configuration, various subscriptions for the services may be entered into by the users of the services. The subscriptions may define subscription limits that limit the extent of use of the services provided by the network devices.

To enforce the subscription limits, the network devices may include management controllers. The management controllers may be independent from data and control planes of the network devices, and may enforce the subscription limits on the control plane and the data plane.

Thus, even if a network device is unable to communication with a communication management system that manages subscriptions, the management controller may independently enforce subscription limits on the services provided by the network devices. By doing so, user of the managed communication system may obtain improved network traffic management services through improved configuration of the network devices while balancing risk presented to the remote managers of the network devices.

If a control plane is suspected of being compromised, the management controller of a network device may initiate remedial actions to confirm the suspicion. The remedial activity may include programming of a control plane to test whether the control plane faithfully operates in accordance with the programming. To identify whether the control plane faithfully operates in accordance with the programming, the operation of a data plane managed by the control plane may be monitored to obtain metrics quantifying the level of service provided by the data plane. Actually provided levels of services may be compared to subscriptions to identify whether differences exist. If a sufficient difference is apparent, then the management controller may conclude that the control plane is compromised.

If confirmed as being compromised, the management controller may perform various actions to limit operation of the control plane and conform operation of the data plane to meet the subscriptions. For example, the management controller may generate extra network data units to consume resources of the data plane thereby limiting use of services provided by the network device even if the control plane is not enforcing subscription limits.

By doing so, embodiments disclosed herein may provide desired services even while control planes of network devices are compromised. Thus, embodiments disclosed herein may address, among others, the technical problem of device security and remediation in distributed systems that may present elevated vectors of attack. The embodiments may do so through characterization of operation of network devices and corresponding remediation activity.

In an embodiment, a method of managing operation of a distributed system is provided. The method may include making, by a management controller of a first network device, an identification that a control plane of the first network device is suspected of being compromised; obtaining, by the management controller and based on the identification, a test network policy based on a subscription that governs the first network device; programming, by the management controller and using the test network policy, the control plane to obtain an updated control plane; measuring, by the management controller and based on the test network policy and after the updated control plane has programmed a data plane of the network device, a level of network service provided by the data plane and that is governed by the test network policy; making a first determination regarding whether the level of network service is commensurate with the subscription; in a first instance of the first determination where the level of network service is not commensurate with the subscription: performing, by the management controller, an enforcement action to update operation of the data plane based on the subscription to obtain an updated data plane; and providing, by the network device, network data unit processing services using the updated data plane.

Measuring the level of network service may include initiating, by the management controller, remote monitoring of the level of network service provided by the network device by a remote device; and obtaining, by the management controller, a report of the level of network service provided by the network device by the remote device.

Initiating the remote monitoring may include generating, by the management controller, a disguised network data unit comprising a payload requesting that remote monitoring be initiated by a second management controller of a second network device; and injecting, by the management controller, the disguised network data unit into a network data processing pipeline of the data plane.

The report of the level of network service may be obtained via at least a second disguised network data unit from the second management controller.

The test network policy may specify a change in the level of network service provided by the data plane, and the change is quantifiable by a remote device.

The test network policy may specify a change in bandwidth of a port of the network device authorized for use, and the port being operably connected to the remote device via an in-band link.

The management controller may include a data processing system, the control plane is hosted by computing resources of the network device, and the data processing system operates independently from the computing resources.

The management controller may be operably connected to the computing resources via a first management channel, and the first management channel may be usable by the management controller to configure the computing resources.

The data plane may be hosted by a special purposes hardware device operably connected to in-band links through which network traffic is obtained and forwarded on to other devices, and the management controller may be operably connected to at least one other device via an out-of-band link.

The management controller may be operably connected to the special purpose hardware device via a second management channel, and the second management channel may be usable by the management controller to configure the special purpose hardware device.

The special purpose hardware device may include a switch application specific integrated circuit adapted to forward network traffic.

The subscription may be for a level of service to be provided by the network device to a subscribing entity.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. The computer-implemented services may include, for example, database services, data processing services, electronic communication services, and/or any other services that may be provided using one or more computing devices.

When providing the computer implemented services, the computing devices may need to communicate with other devices. To do so, the computing devices may be operably connected to networks. The networks may facilitate communications between the computer devices and/or other devices.

The networks may include any number of network devices. The network devices may facilitate network communications by sending and receiving network data units. The network data units may include a payload and control information. The payload may correspond to data transported between devices, and the control information may facilitate network routing, switching, etc.

For example, the control information may include information regarding where a network data unit originated, a destination for the network data unit, and/or other types of information that may allow intermediary devices to decide how to forward the network data units toward corresponding destinations.

Any of the network devices may be connected to any number of other network devices and/or computing devices. There may be many options for forwarding network data units within the network environment towards destination locations.

The traffic forwarding behavior (e.g., how each network data unit is forwarded, which may include deciding out of which port to forward a network data unit, how to encapsulate the network data unit with control information, etc.) of the network devices may be configurable. The configurability may allow for forwarding preferences to be implemented. For example, the forwarding preferences may allow for administrators of a deployment to shape traffic to meet certain goals (e.g., enable high fidelity video conferences, low latency for latency dependent workloads, etc.).

However, if the forwarding preferences are out of sync with desired goals for a deployment, then operation of the deployment may be negatively impacted. For example, if traffic shaping policies are implemented that do not align the goals, then the goals may be frustrated. Selecting and applying such policies may be challenging even for experienced system administrators.

In general, embodiments disclosed herein relate to systems, devices, and methods for managing operations of networks of distributed system using a subscription system. To manage the operation of networks using the subscription system, network devices may be deployed to establish a managed communication system. When deployed, the network devices may be over provisioned by including more resources for managing network traffic than is expected to be required for traffic management purposes.

Rather than being managed by users, the managed communication system may be managed by a vendor or other organization (e.g., any being a "managed communication system provider"). The vendor may be responsible for managing operation of the managed communication system.

User, organizations, and/or other entities (e.g., any being a "managed network user") may subscribe to communication services provided by the managed communication system. The managed network users may indicate their desire for outcomes with respect to use of the communication services provided by the managed communication system. The managed communication system provider may use the desired outcomes to establish subscriptions for the communication services.

The subscriptions may be used to define intermediate representations for configurations of network devices of the managed communication system. The intermediate representations for the configurations of the managed system may provide criteria by which each network device may measure its performance against corresponding subscription. Rather than explicitly define the configuration and operation of each network device, each (and/or groups of) network device may identify how to configure itself based on the intermediate representation. Thus, decision making authority may be distributed between the network devices and management entities tasked with managing the network devices.

To conform operation of the network devices, corresponding intermediate representations and subscriptions may be provided to the network devices. Each network device may then decide how to configure itself, and may use the intermediate representation to measure its operation with respect to corresponding subscriptions.

The provided subscriptions may include information regarding the subscriptions such as limits on the use of the network devices by managed communication system users. The network devices may independently enforce the subscription limits.

By doing so, embodiments disclosed herein may improve computer implemented services provided by a distributed system by improving the likelihood that network traffic in a manner that is aligned with the computer implemented services.

To provide the above noted functionality, the system of FIG. 1A may include network management system 100, user devices 102, communication system 105, and deployment 110. Each of these components is discussed below.

Network management system 100 may facilitate use and management of managed communication system 120 by managed communication system users. To do so, network management system 100 may (i) provide a portal (e.g., a webpage or other type of interface) through which subscriptions for services provided by managed communication system 120 may be provided, (ii) establish subscription and intermediate limitations using information obtained through the portal, and (iii) distribute information regarding the subscriptions and intermediate limitations to network devices (e.g., 122-124) of managed communication system 120.

User devices 102 may be used by managed communication system users to establish subscriptions for use of managed communication system 120. User devices 102 may utilize the portal provided by network management system 100 to provide user input to network management system 100. The user input may convey desired outcomes for user of managed communication system 120.

For example, the portal may include a graphical user interface. The graphical user interface may display information regarding (i) managed communication system 120, (ii) services that managed communication system 120 may provide, (iii) existing subscriptions for user of managed communication systems, and/or other information regarding services that may be subscribed to by the user (e.g., such as used of data processing systems 130, which may be managed with a similar subscription based model). The graphical user interface may include fields in which the users of user devices 102 may input user input to convey desires for user of services, confirm acceptance of terms of subscriptions, and/or otherwise facilitate collaboration between network management system 100 and the users of user devices 102.

Deployment 110 may provide computer implemented services (e.g., to users of deployment 110 and/or to devices operably connected to deployment 110). To do so, deployment may include data processing systems 130 and managed communication system 120. Data processing systems 130 may include any number of data processing systems (e.g., 132-134) that provide the computer implemented services. When providing the computer implemented services, data processing systems 130 may generate network traffic (e.g., network data units directed to various entities) and utilize the services provided by managed communication system 120 to transmit the network data units to destinations.

Managed communication system 120 may provide managed communication services. The managed communication services may be provided in accordance with subscriptions. The managed communication services may include transmitting network traffic between data processing systems and/or other devices.

To provide the managed communication services, managed communication service 120 may include any number of network devices (e.g., 122-124). The network devices may be organized in a network topology to facilitate transmission of network traffic. Each network device may manage its operation in accordance with intermediate representations and subscriptions provided by network management system 100. Refer to FIG. 1B for additional details regarding network devices.

When providing their functionality, any (and the components thereof) of network management system 100, user devices 102, and deployment 110 may perform any of the actions and methods illustrated in FIGS. 2A-3D.

Any of (and/or components thereof) network management system 100, user devices 102, and deployment 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1A may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

Turning to FIG. 1B, a block diagram of network device 122 in accordance with an embodiment is shown. Any of network devices 122-124 may be similar to network device 122.

To provide traffic management services, network device 122 may include network data unit processing resources 140, computing resources 142, and management controller 144. Each of these components is discussed below.

Network data unit processing resources 140 may provide configurable traffic management services. To provide the configurable traffic management services, network data unit processing resources 140 may include special purpose hardware such as a switch application specific integrated circuit (SASIC). The SASIC may include a network data unit processing pipeline used to route and switch network data units between interfaces (e.g., 154, 152).

The network data unit processing pipeline may operate in accordance with a processing standard such as the P4 programming language that allows the manner in which network data units are processed for forwarding purposes to be configured. The processing pipeline may use a routing information base and/or other data structures (e.g., equal cost multipath tables) to decide how to direct network data units. For example, when a network data unit is received, the control information may be used to decide how to forward the network data unit towards a destination. The network data unit processing pipeline may sequentially make decisions regarding which interface out of which to send the network unit, control information to add/remove from the network data unit prior to forwarding, etc.

Additionally, as noted above, the processing pipeline may add or remove control information (e.g., via encapsulation) to enable network data units (e.g., packets) to be transmitted across a network. For example, the processing pipeline may facilitate multiprotocol approaches such as a label switched network (e.g., labels added to the control information to facilitate rapid identification of egress interfaces) overlayed over an internet protocol (IP) based forwarding network. Thus, network data units with varying control information may be forwarded, and any network device may serve as an ingest point to an overlay network.

Network data unit processing resources 140 may operate as part of a data plane of network device 122. The data plane may provide traffic management services obtained from any number of in-band links (e.g., 164, 164) via corresponding interfaces (e.g., 152-154, may include physical ports). The in-band links may be organized as up/down links depending on the location of network device 122 within a network architecture. Any of the interfaces (e.g., in-band interfaces 152-154, separate from the out-of-band interfaces such as interface 156) may be reconfigurable between up/down links and/or may be bi-directional.

Network data unit processing resources 140 may be operably connected to computing resources 142. Computing resources 142 may host applications that operate as part of a control plane of network device 122. The control plane may (i) maintain information regarding the network environment in which network device 122 resides (e.g., as part of a forwarding information base), (ii) maintain information regarding various network policies to be implemented by network devices 122 (e.g., the network policies may define traffic shaping rules, quality of service requirements, and/or other types of requirements for operation of network device 122), (iii) generate/provide the routing information bases used by the data plane to make network data unit processing decisions, (iv) configure operation of the data plane (e.g., by sending instructions via management link 174) based on the routing information base, the network policies, and/or other information, and/or otherwise generally manage operation of networking device 122.

Figure 4:
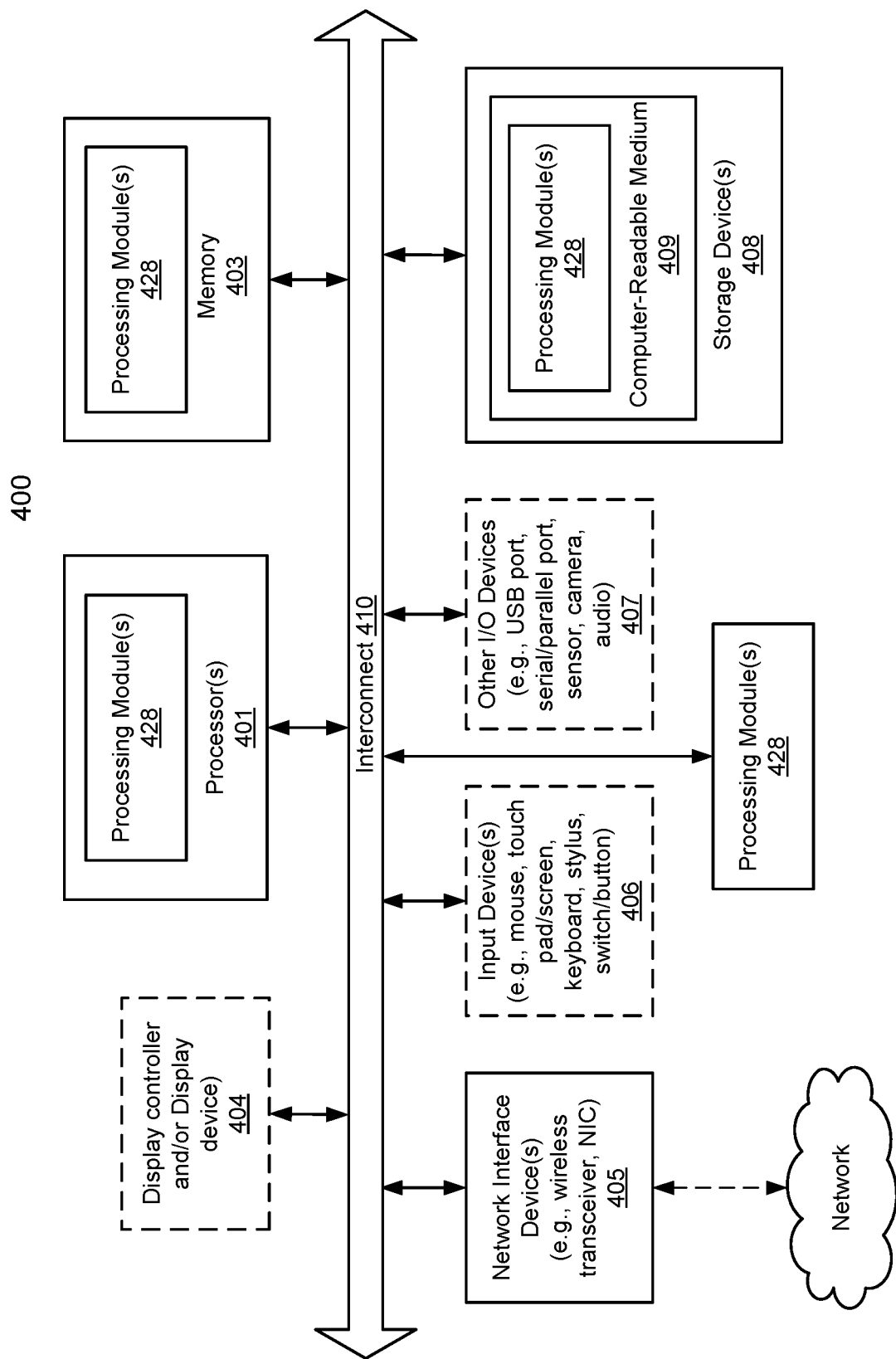
FIG. 4 shows a block diagram illustrating a data processing system in accordance with an embodiment.

Computing resources 142 may be an independently operating data processing system (e.g., refer to FIG. 4 for additional information). However, by virtue of its configurability, computing resources 142 may be subject to compromise. For example, a malicious party that has access to network device 122 may attempt to modify the operation of computing resources 142 (e.g., by installing malicious programs, malicious modifying configuration settings/data structures, modifying network policies, etc.). The malicious party may do so by virtue of physical access to the physical components of computing resources 142 and/or privileged use.

Computing resources 142 may at least to some extent be configurable by a user or subscriber to the services provided by the network device. For example, users (e.g., privileged users) may be allowed to perform various configurations which may present avenues of attack should a user initiate malicious action. If exploited, the avenues of attack may be used, for example, to cause the control plane to ignore or otherwise not enforce limits on use of the services provided by network device 122.

To limit the impacts of and/or risk of compromise of computing resources 142, management controller 144 may manage the operation of the control plane and data plane of network device 122. Management controller 144 may be implemented using a secure system on a chip (or other type of secure independently operating computing device). Management controller 144 may be operably connected to the components of the data plane and control plane via management link 172 and management link 170, respectively. These management links may give management controller 144 direct, bare metal management control over computing resources 142 and network data unit processing resources 140. Consequently, management controller 144 may directly modify the operation of any of these hardware devices, data stored by these devices, may obtain data from these hardware devices, and/or may otherwise directly manage these hardware devices. In contrast to the control plane which may at least to some extent be configuration, the management controller may not be configurable or otherwise usable by user/subscribers for services provided by the network device.

Additionally, management controller 144 may enforce subscriptions across network device 122. To enforce the subscription, management controller 144 may (i) obtain intermediate representations and information regarding subscriptions from network management system 100 via out-of-band link 166 through interface 156 (e.g., an out-of-band management port) which may provide independent network connectivity for management controller 144, (ii) use the intermediate representations to obtain configuration data for the control plane and/or data plane, (iii) modify the operation of the control plane and/or data plane based on the configuration data to update operation of the control/data plane, (iv) monitor the operation of the control/data plane with respect to subscription limits for subscribed to services provided by network device 122, and (v) enforce the subscription limits (e.g., by further modifying operation of the control/data plane).

Management controller 144 may operate as part of a management plane for network device 122. As part of its operation, management controller 144 may monitor computing resources 142 for signs of malicious activity and may, for example, take action to address the malicious activity, to blunt an impact of the malicious activity on operation of network device 122 (e.g., may quarantine computing resources 142 from network data unit processing resources 140 by disabling management links or other means), and/or may perform other actions to manage operation of network device 122. The malicious activity may include, for example, attempts by subscribers to services provided by network device 122 to circumvent subscription limits. A subscriber may attempt to do so by modifying operation of computing resources 142 and hosted software, by cutting off management controller 144 from communications with other devices (e.g., by disconnecting out-of-band link 166, and/or taking other actions to circumvent management of network device 122 by a provider.

To address such malicious activity, for example, if management controller 144 suspects that the control plane has been compromised, then management controller 144 may take action (i) to confirm the compromise, and (ii) address the compromise. Management controller 144 may do so, for example, by initiating testing of the levels of service being provided by network device 122. If malicious activity is confirmed through testing, then management controller 144 may act to address the malicious activity.

To do so, management controller 144 may select a test network policy (not yet implemented by the control plane), and program the control plane using the test network policy. If not compromised, the control plane may use the test network policy to program the data plane. However, if compromised, the control plan may not implement restrictions or limits imposed by the test network policy.

To ascertain whether the control plane has used the test network policy, management controller 144 may initiate local and/or remote monitoring of operation of the data plane. The monitoring may look for indications that the test network policy has not been faithfully used to program the data plane. For example, management controller 144 may both locally monitor operation of the data plane to identify the level of network service provided by the data plane and/or initiate remote monitoring by other network devices to obtain reports of the level of network service provided by the data plane.

To reduce the likelihood of detection of initiation of remote monitoring, management controller 144 inject disguised network data units into the data plane. The disguised network data units may appear to be typical network traffic, but may include instructions to initiate the remote monitoring. Management controller 144 may also and/or alternatively use out-of-band link 166 to send such instructions to other network devices.

Based on the local monitoring and reports from remote devices such as other network devices, management controller 144 may compare the level of network service provided by the data plane to the subscription to identify if a variance of sufficient magnitude exists. If sufficient, management controller 144 may conclude that the control plane is compromised and may initiate remedial action such as enforcement activity to modify operation of the data plane and/or the control plane. Refer to FIGS. 2A-2D for additional details regarding identification of compromised control planes of network devices.

While illustrated in FIG. 1B with respect to a limited number of specific components, it will be appreciated that a network device in accordance with an embodiment may include additional, fewer, and/or different components without departing from embodiments disclosed herein.

To further clarify embodiments disclosed herein, data flow diagrams showing example interactions between components of the system of FIG. 1A in accordance with an embodiment are shown in FIGS. 2A-2D. In FIGS. 2A-2D, circles including numbers are used to indicate operations occurring at different points in time. For example, all operations described with reference to number one (1) may occur at a first point in time and all operations described with reference to the number two (2) may occur at a second point in time after the first point in time, etc. While the operations are provided in an example temporal order (e.g., time point one before time point two), it will be appreciated that the operations may be performed in other orders from those illustrated and described herein. The circles are overlayed on top of components that may perform the corresponding operations.

Turning to FIG. 2A, a first data flow diagram in accordance with an embodiment is shown. FIG. 2A may illustrate a first example scenario where, at operation 1, management controller 144 may suspect that the control plane of networking device 122 is compromised. Management controller 144 may suspect that the control plane is compromised, for example, based on behavior exhibited by computing resources 142.

For example, an untrusted application may be executing on computing resources 142, network policies (e.g., created by management controller 144) may appear to be being ignored by the control plane, etc. One of the network policies may specify a default use policy that generally limits use of the functionality of network device 122 absent other policies, but the operation of the control and/or data plane may appear to exceed that and other policies. In other words, computing resources 142 and the hosted control plane may appear to be ignoring or otherwise not using/enforcing the default use policy and/or other network policies.

Based on this suspicion, management controller 144 may select a test network policy. The test network policy may be based on a subscription, or may not be based on a subscription.

Using the test network policy, management controller 144 may program computing resources 142 to update a control plane of network device 122. The updated control plane may, if not compromised, faithfully use the test network policy to program the data plane of network device 122.

If uncompromised, at operation 2, the updated control plane may program the data plane using the test network policy. For example, the control plane may update the routing information base and/or other data structures based on the test network policy, and may program the data plane using the updated data structures.

However, if compromised, at operation 2, the updated control plane may program the data plane without enforcing the test network policy. For example, the test network policy may specify various limitations on operation of the data plane (e.g., disabling ports, limiting uplink/downlink bandwidth, limiting use of communication protocols, etc.). If compromised, the control plane may not update the data structures used to program the data plane using these limitations. Consequently, if compromised, the data plane may provide network services that exceed subscription entered into by managed service users.

To ascertain whether the control plane is compromised, at operation 1, management controller 144 may also initiate local and/or remote monitoring of the data plane. For example, management controller 144 may send requests to remote network devices (e.g., to other management controllers) via out-of-band link 166 to initiate the monitoring.

However, a malicious actor may physically or logically disconnect out-of-band link 166 thereby limiting the ability of management controller 144 to communicate with remote devices. If limited, management controller 144 may instead leverage the data plane to send the requests to remote entities. To do so, management controller 144 may generate disguised network data units and inject them into the network data unit processing pipeline of the data plane of network device 122.

Consequently, at operation 3, the data plane may process the disguised network data units and transmit them to the remote devices. The network data units may be disguised, for example, by adding control information that impersonates other devices (e.g., forged encapsulation layers). In this manner, it may be less likely that filters or other mechanisms programmed by the control plane into the data plane are able to screen the disguised network data units from reaching destination devices.

Thus, via the data flow shown in FIG. 2A, a management control may initiate processing for ascertaining whether a control plane is compromised.

Figure 2B:
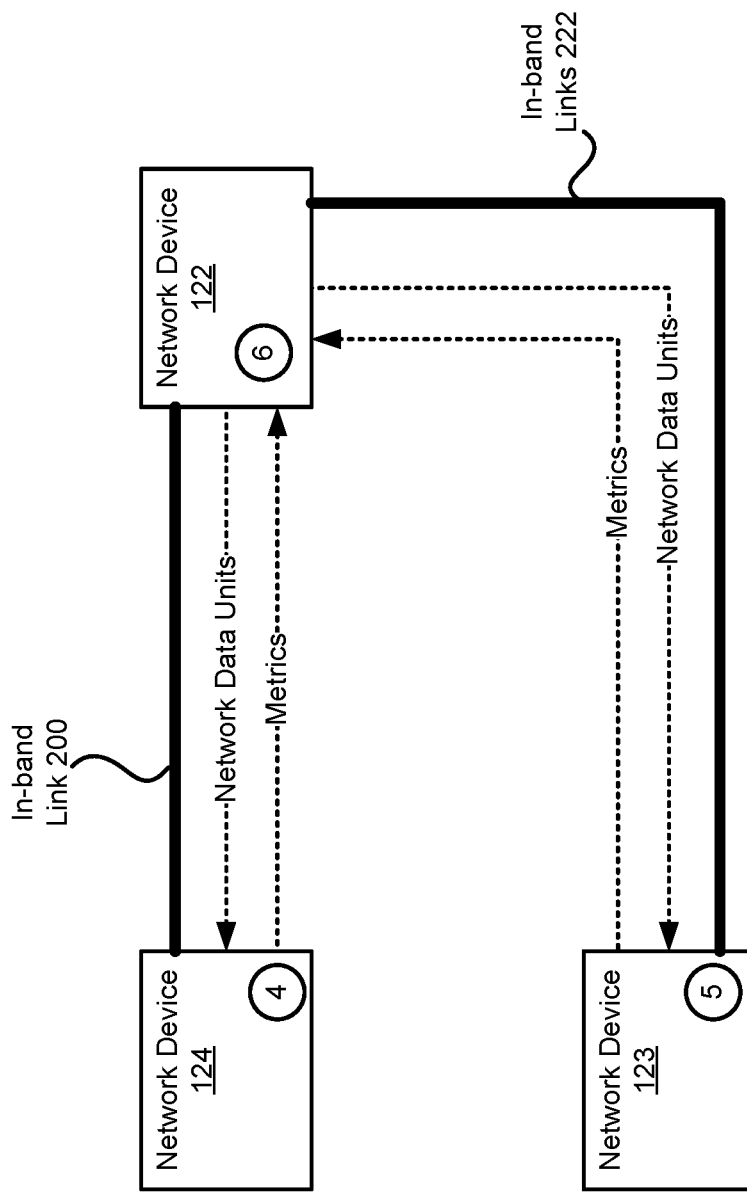

Turning to FIG. 2B, a second interaction diagram in accordance with an embodiment is shown. FIG. 2B may illustrate a second example scenario where, after injection of the disguised network data units to the network data unit processing pipeline of the data plane of network device 122, network device may transmit the disguised network data units to other network devices, such as network devices 123-124.

At operations 4 and 5, while receiving network data units, network devices 123-124 may receive the disguised network data units. Hosted management controllers may obtain the disguised network data units and read the requests for initiation of testing. The management controllers may then initiate various testing procedures. The testing procedures may measure aspects of received network data units (e.g., such as flow rate, latency, distribution of use in different communication protocols, etc.). Reports may be generated based on the measurements. These reports may be distributed to network devices 122 as part of network environment discovery procedures, network management procedures, and/or other procedures performed by network devices 123-124.

By virtue of these reports being generated while the network traffic is being transmitted by network device 122, the metrics may be used to judge the level of service being provided by network device 122.

For example, at operation 6, when the reports are obtained by network device 122, the management controller may retrieve the reports and metrics included in the reports. The metrics may then be used to ascertain whether subscription limits are being enforced, and infer whether the control plane is compromised (e.g., for lack of subscription limit enforcement).

Figure 2C:
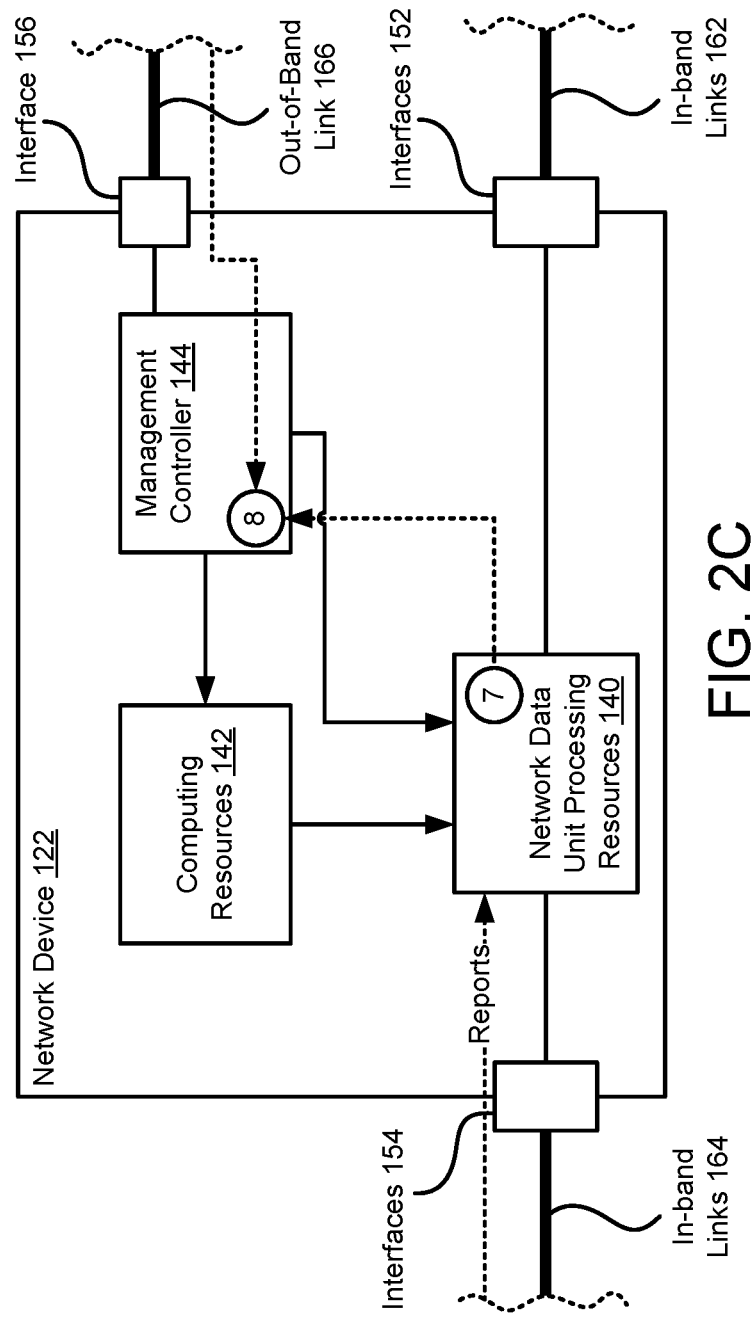

Turning to FIG. 2C, a third interaction diagram in accordance with an embodiment is shown. FIG. 2C may illustrate a third example scenario where, at operation 7, management controller 144 may read network data units from the data plane corresponding to the reports from the other network devices.

If out-of-band link 166 is operable, management controller 144 may receive the reports from the management controllers of the other network devices.

Once the reports are obtained, at operation 8, management controller 144 may process locally measured metrics regarding the level of network service provided by the data plane and/or reports from the other network devices to identify the level of service being provided by the data plane. To do so, management controller 144 may reconcile (e.g., average) the metrics obtained by management controller 144 and/or metrics derived from the reports from the other network devices.

Once reconciled (if reconciled, in some embodiments only some metrics may be used), management controller 144 may compare the level of service identified using the metrics and compare it to the subscription. If there is a variance between the actual level of service and the subscription that meets a criteria (e.g., such as a threshold level), then management controller 144 may conclude that the control plane is compromised.

Figure 2D:
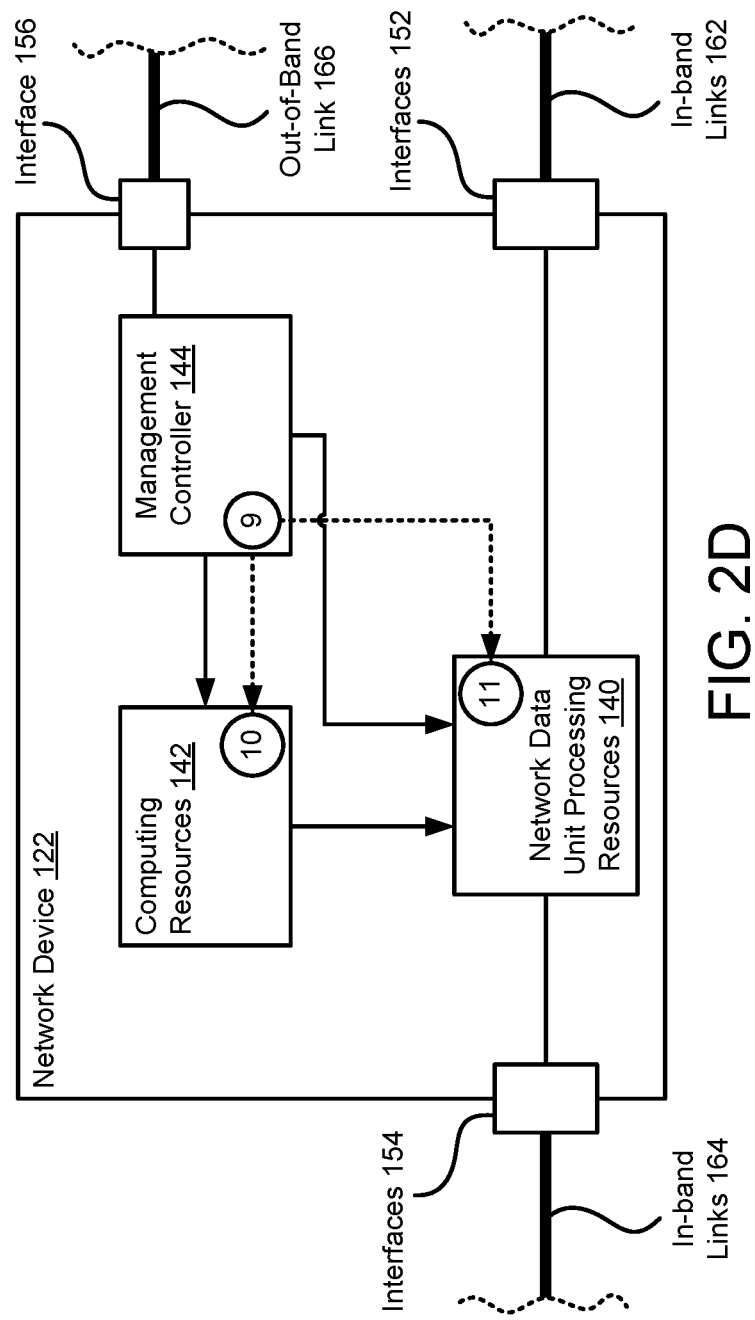

Turning to FIG. 2D, a fourth interaction diagram in accordance with an embodiment is shown. FIG. 2D may illustrate a fourth example scenario where, at operation 9, management controller 144 concludes that the control plane is compromised. Based on the conclusion, management controller 144 may select one or more enforcement actions to perform. The enforcement actions may include, for example, (i) quarantining computing resources 142, (ii) initiating remediation of computing resources 142 (e.g., running malware/antivirus removal software, recovering the computing resources to a previous uncompromised state, etc.), and (iv) modifying operation of the data plane to conform its operation to various subscriptions previously believed to be faithfully met by the control plane.

For example, at operation 10, responsive to instructions from management controller 144, the control plane may initiate recovery procedures, may suspend or terminate operation of various pieces of software, may perform virus and/or malware or other threat detection and recovery procedures, etc.

In another example, at operation 11, also responsive to instructions from management controller 144, the data plane may update its operation. For example management controller 144 may (i) read the forwarding information based on computing resources 142, (ii) calculate faithful programming for the data plane that meets the subscriptions, and (iii) program the data plane to conform its operation to meet the subscriptions.

Thus, as shown in FIGS. 2A-2D, embodiments disclosed herein facilitate enforcement of subscriptions even when control planes/data planes of network devices are compromised.

As discussed above, the components of FIG. 1A may perform various methods to manage operation of a distributed system through management of communication systems. FIGS. 3A-3D illustrate methods that may be performed by the components of the system shown in FIGS. 1A-2D. In the diagram discussed below and shown in FIGS. 3A-3D, any of the operations may be repeated, performed in different orders, and/or performed in parallel with or in a partially overlapping in time manner with other operations.

Figure 3A:
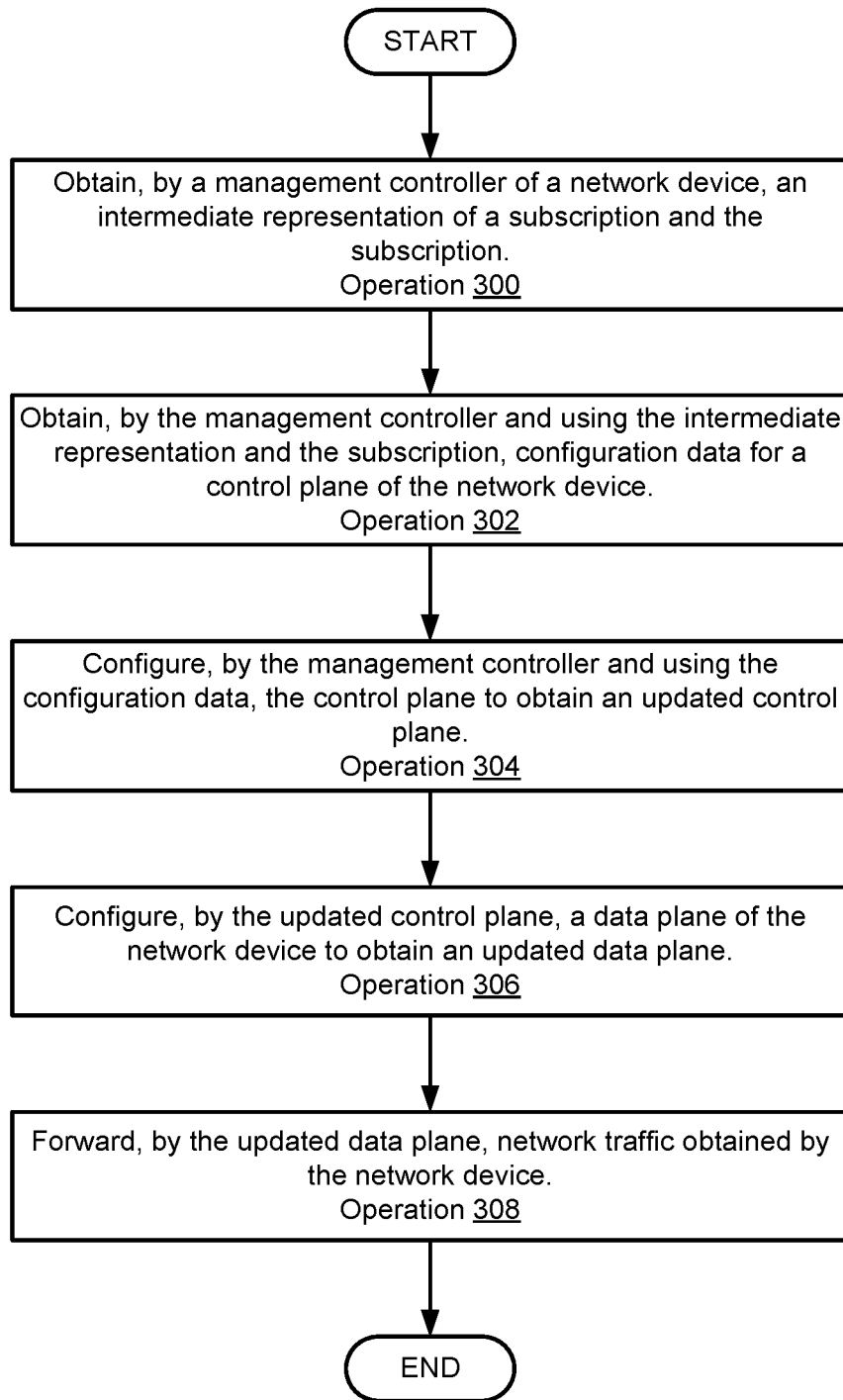
FIGS. 3A-3D show flow diagrams illustrating methods in accordance with an embodiment.

Turning to FIG. 3A, a first flow diagram illustrating a method of managing services provided by a network device in accordance with an embodiment is shown. The method may be performed, for example, by a deployment, a network management system, a user device, and/or devices of the system of FIGS. 1A-2D and/or components thereof.

Prior to operation 300, a user may interact with a network management system to establish use of services by a managed communication system. The interaction may result in the generation of an intermediate representation and a subscription.

At operation 300, the intermediate representation and the subscription are obtained by a management controller of a network devices of the managed communication system. The intermediate representation and subscription may be obtained by reading them from storage, receiving them from another device (e.g., the network management system), through generation based on user input, and/or via other methods. If received from another device, the intermediate representation and the subscription may be received via an out-of-band link.

At operation 302, configuration data for a control plane of the network device is obtained by the management controller and using the intermediate representation and the subscription. The configuration data may be obtained by applying a set of result, a model, and/or a different algorithm to generate the configuration data.

The configuration data may also be obtained using information regarding the network device that is known to the management controller. For example, the information may regarding the network device may include capabilities (e.g., hardware/software components) of the network device, responsibilities (e.g., other subscription supported by the network device, various workloads) of the network device, the network information regarding the network environment in which the network device resides, historical activity (e.g., attempts to compromise the network device), and/or other types of information regarding the network device.

The resulting configuration data may include, for example, network policies and/or other types of data usable to update operation of the control plane.

For example, consider a scenario where an intermediate representation sets a latency goal for traffic forwarded to a second network device to be under a predetermined threshold level. To establish a network policy that facilitates accomplishing the aforementioned goal, the management controller may analyze the underlying capabilities of the network device, the existing network policies (e.g., to screen for conflicts), and/or other factors that are unknown to the network management system. Thus, the resulting network policy may have a far higher likelihood of successfully accomplishing the goal.

At operation 304, the control plane may be configured by the management controller using the configuration data to obtain an updated control plane. The control plane may be configured by generating and sending instructions to the control plane via a management channel. The instructions may, when performed by the control plane, cause the network policy to be integrated into and/or otherwise used in programming of the data plane (e.g., during a future programming cycle which may be triggered by the new network policy). For example, the network policy may cause the routing information base used by the data plane to be updated thereby causing the data plane to forward network traffic differently.

At operation 306, the data plane of the network devices is configured by the updated control plane to obtain an updated data plane. The updated control plane may, based on its updated operation, update the routing information base and/or other data structures (e.g., feature enablement/disablement). The routing information base and/or other data structures may be automatically used to program the data plane in a next update cycle for the data plane.

At operation 308, network traffic obtained by the network device is forwarded by the updated data plane. The network traffic may be processed differently by the data plane when compared to being updated. For example, one or more features of the data plane previously disabled may be updated, different quality of service requirements may be enforced, etc. Thus, when a network data unit is obtained as part of the network traffic, the manner in which it is processed by a processing pipeline of the updated data plane may apply different control information (e.g., may apply a label giving the network data unit a higher priority), may prioritize the network data unit for processing based on its control information, etc.

The method may end following operation 308.

Thus, via the method shown in FIG. 3A, embodiments disclosed herein may provide a network device that may be remotely managed in accordance with a subscription based management model.

Figure 3B:
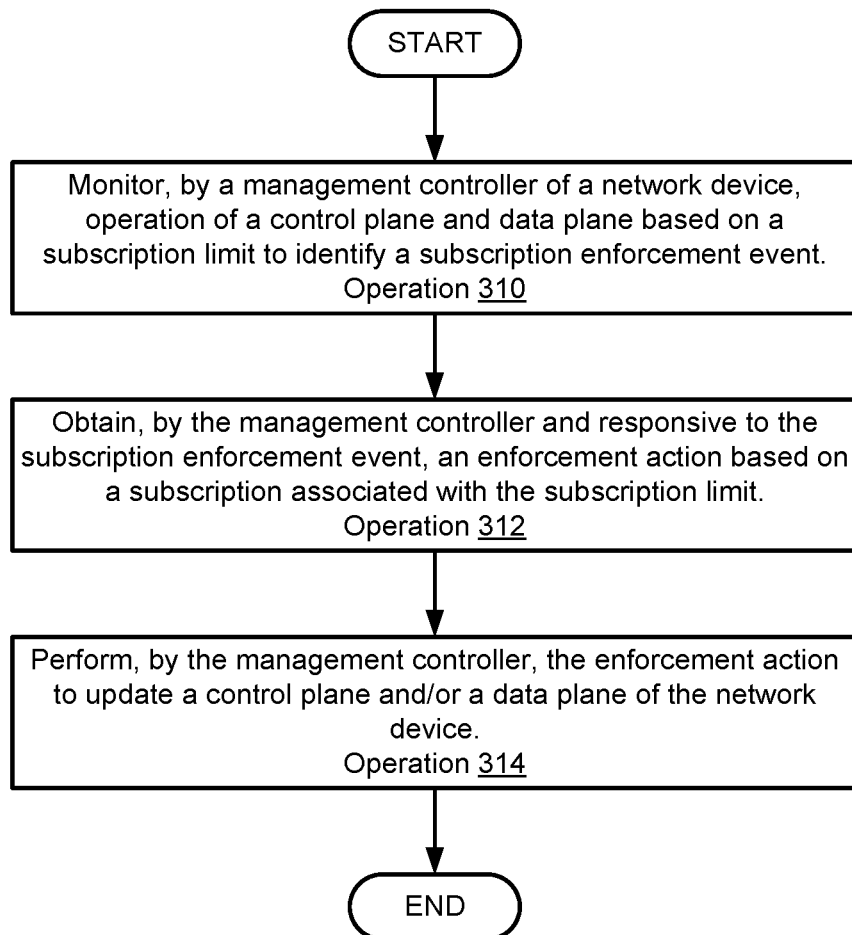

Turning to FIG. 3B, a second flow diagram illustrating a method of managing services provided by a network device based on subscriptions in accordance with an embodiment is shown. The method may be performed, for example, by a deployment, a network management system, a user device, and/or devices of the system of FIGS. 1A-2D and/or components thereof.

At operation 310, operation of a control plane and a data plane of a network device may be monitored by a management controller. The monitoring may be based on subscription limits. The monitoring may be performed to identify a subscription enforcement event.

To monitor the operation of the control plane, the management controller may use management links to identify activity of the control plane. The activity may be recorded and compared against the subscription limits to identify whether a subscription limit has been reached. For example, the activity may be monitored, for example, to identify numbers of features of the data plane that are enabled, likely aggregate use rates of services provided by the data plane, etc.

To monitor the operation of the data plane, the management controller may use management links to identify activity of the data plane. The activity may be recorded and compared against the subscription limits to identify whether a subscription limit has been reached, similar to monitoring of the control plane. For example, the activity may be monitored, for example, to identify use rates of various services provided to the data plane (e.g., which may directly correspond to use limits), features of the data plane that are enables, to identify the current time, etc.

The subscription enforcement events may be operation of the network device reaching a subscription limit.

At operation 312, an enforcement action is obtained by the management controller and responsive to occurrences of subscription enforcement events. The enforcement action may be based on a subscription associated with the subscription limit. The enforcement action may be obtained by reading the enforcement action from the subscriptions for which subscription limits have been reached.

At operation 314, the enforcement action is performed by the management controller to update a control plane and/or a data plane of the network device. The enforcement action may be performed, for example, by sending various instructions to the control/data plane via management channels. The corresponding receiving plane may perform the instructions thereby updating their operation accordingly. Generally, the enforcement action may limit the use of the receiving plane (e.g., reversing whatever features were enabled by the subscription).

The method may end following operation 314.

Thus, using the method shown in FIG. 3B, embodiments disclosed herein may enable enforcement of subscriptions. The subscription may be enforced in a manner that is independent from nominal operation of a control plane and/or data plane. For example, even when the control plane is compromised, the management plane may likely remain uncompromised thereby allowing the management controller to initiate performance of actions to enforce the subscription limits.

However, if the control plane is compromised, then the management controller may be unable to effectively monitor operation of the data plane and/or control plane. For example, a compromised control plane may misreport its activity and/or operation of the data plane.

Figure 3C:
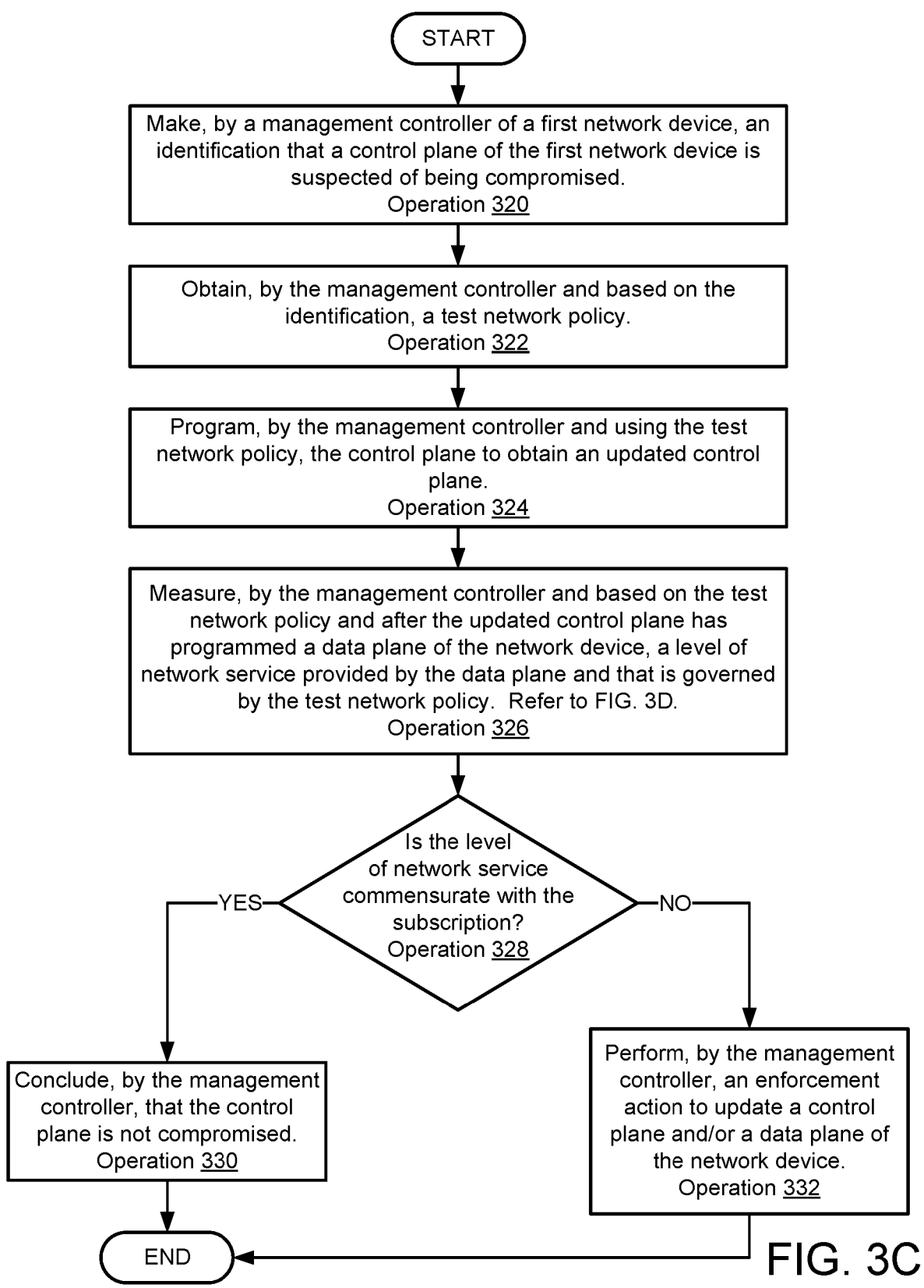

Turning to FIG. 3C, a third flow diagram illustrating a method of managing control planes suspected of being compromised in accordance with an embodiment is shown. The method may be performed, for example, by a deployment, a network management system, a user device, and/or devices of the system of FIGS. 1A-2D and/or components thereof.

At operation 320, a management controller of a first network device makes an identification that a control plane of the first network device is suspected of being compromised. The identification may be made by monitoring activity of the control plane, based on data regarding operation of the first network device, and/or via other methods. For example, the management controller may monitor the control plane for signs of unexpected activity (e.g., signatures of unexpectedly executing applications, lack of use of network policies that were previously deployed, etc.).

At operation 322, a test network policy is obtained by the management controller. The test network policy may be obtained by reading it from storage, receiving it from another device, generation by the management controller, and/or via other methods. The test network policy may be a network policy the specifies a change in a service level to be provided by a data plane of the network device. The change may be, for example, disablement of a port, change in bandwidth of a port usable for sending/receiving network traffic, disablement of use of a communication protocol, etc.

At operation 324, the control plane of the network device is programmed by the management controller using the test network policy to obtain an updated control plane. The control plane may be programmed by generating and sending instructions to the control plane. The instructions may be to implement the test network policy. If uncompromised, the updated control plane may faithfully implement the test network policy in future programming of the data plane. Thus, the data plane may operate in a manner defined in part by the test network policy if faithfully implemented.

Figure 3D:
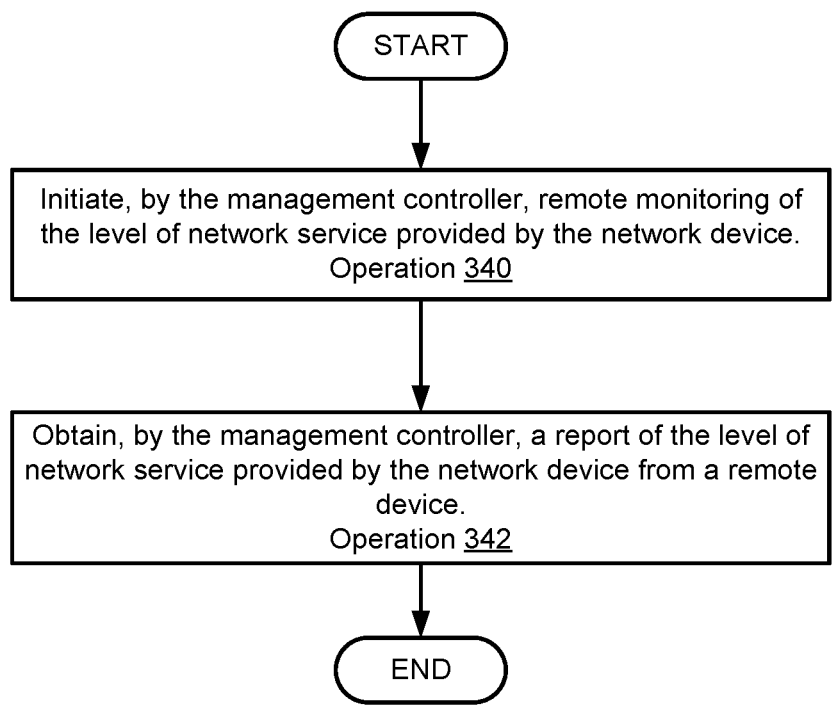

At operation 326, a level of network services provided by the data plane of the first network device and that is governed by the test network policy is measured by a management controller based on the test network policy and after the updated control plane has programmed the data plane of the network device. The level of network services may be measured (i) locally with direct measurement of activity of the data plane and (ii) remotely via observations may be other network devices. Refer to FIG. 3D for additional details regarding measurement of the level of network services provided by the data plane.

The direct measurements of the data plane may be made using management links, and may indicate, for example, rates of processing network data units, use of ports for processing, use of communication protocols for processing, and/or other aspects of the operation of the data plane. The direct measurements may provide quantifications such as metrics. Metrics may also be obtained from reports based on remote observations.

At operation 328, a determination is made regarding whether the level of network service is commensurate with a corresponding subscription. The determination may be made by comparing actual level of performance (e.g., as quantified by the metrics) to the level of performance specified by the subscription to identify whether the level of actual performance exceeds the level specified by the subscription by a sufficient degree (e.g., a threshold level). If it does, then the management controller may conclude that the level of network service is not commensurate with the subscription.

If the level of service is commensurate with the subscription, then the method may proceed to operation 330. Otherwise, the method may proceed to operation 332.

At operation 330, the management controller may conclude that the control plane is not compromised. If not compromised, then the management controller may not take any remedial action.

The method may end following operation 330.

Returning to operation 328, if the level of network service is not commensurate with the corresponding subscription, then the method may proceed to operation 332.

At operation 332, an enforcement action to update a control plane and/or a data plane of the network devices is performed. The enforcement action may be performed by generating instructions for the enforcement actions and sending them to the corresponding planes. The instructions may be sent via management channels.

The instructions sent to the control plane may, for example, initiating a quarantine of the control plane, anti-virus and/or malware sweep (and/or other process to remote any software that is not trusted), initiate a factory reset, and/or perform other actions that may limit the impact of a compromised control plane.

The instructions sent to the data plane may conform the operation of the data plane to the subscriptions. For example, the instructions may cause the data plane to change its programming thereby modifying the manner in which network data units are processed.

The method may end following operation 332.

Turning to FIG. 3D, a fourth flow diagram illustrating a method of monitoring operation of a data plane of a network device in accordance with an embodiment is shown. The method may be performed, for example, by a deployment, a network management system, a user device, and/or devices of the system of FIGS. 1A-2D and/or components thereof.

At operation 340, remote monitoring of the level of network services provided by the network device is initiated by the management controller. The remote monitoring may be initiated by sending a request to another network device. The request may be sent via an out-of-band channel (if available) and/or via the data plane of the network device via injection of disguised network data units (e.g., that may masquerade as being from another device or the control plane).

The request may cause the network device to initiate monitoring. The monitoring may be performed by monitoring network traffic received from the network device, and the characteristics of the network traffic such as rate, communication protocol breakdown, port use, etc.

At operation 342, a report of the level of network services provided by the network devices is obtained by the management controller from the remote device. The report may be obtained by (i) receiving it via the out-of-band channel, (ii) by obtaining it from the data plane (e.g., by reading received network data units), and/or via other methods.

The method may end following operation 342.

Thus, using the methods shown in FIGS. 3C-3D, embodiments disclosed herein may enforce subscriptions even when control planes of network devices are compromised.

Any of the components illustrated in FIGS. 1A-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a distributed system, the method comprising:
    making, by a management controller of a first network device, an identification that a control plane of the first network device is suspected of being compromised;
    obtaining, by the management controller and based on the identification, a test network policy based on a subscription that governs the first network device;

programming, by the management controller and using the test network policy, the control plane to obtain an updated control plane;

measuring, by the management controller and based on the test network policy and after the updated control plane has programmed a data plane of the first network device, a level of network service provided by the data plane and that is governed by the test network policy;

making a first determination regarding whether the level of network service is commensurate with the subscription;

in a first instance of the first determination where the level of network service is not commensurate with the subscription:

performing, by the management controller, an enforcement action to update operation of the data plane based on the subscription to obtain an updated data plane; and providing, by the first network device, network data unit processing services using the updated data plane.

2. The method of claim 1, wherein measuring the level of network service comprises:

initiating, by the management controller, remote monitoring of the level of network service provided by the first network device by a remote device; and obtaining, by the management controller, a report of the level of network service provided by the first network device by the remote device.

3. The method of claim 2, wherein initiating the remote monitoring comprises:

generating, by the management controller, a disguised network data unit comprising a payload requesting that remote monitoring be initiated by a second management controller of a second network device; and injecting, by the management controller, the disguised network data unit into a network data processing pipeline of the data plane.

4. The method of claim 3, wherein the report of the level of network service is obtained via at least a second disguised network data unit from the second management controller.

5. The method of claim 1, wherein the test network policy species a change in the level of network service provided by the data plane, and the change is quantifiable by a remote device.

6. The method of claim 5, wherein the test network policy specifies a change in bandwidth of a port of the first network device authorized for use, and the port being operably connected to the remote device via an in-band link.

7. The method of claim 1, wherein the management controller comprises a data processing system, the control plane is hosted by computing resources of the first network device, and the data processing system operates independently from the computing resources.

8. The method of claim 7, wherein the management controller is operably connected to the computing resources via a first management channel, and the first management channel being usable by the management controller to configure the computing resources.

9. The method of claim 8, wherein the data plane is hosted by a special purposes hardware device operably connected to in-band links through which network traffic is obtained and forwarded on to other devices, and the management controller is operably connected to at least one other device via an out-of-band link.

10. The method of claim 9, wherein the management controller is operably connected to the special purpose hardware device via a second management channel, and the second management channel being usable by the management controller to configure the special purpose hardware device.

11. The method of claim 10, wherein the special purpose hardware device comprises a switch application specific integrated circuit adapted to forward network traffic.

12. The method of claim 1, wherein the subscription is for a level of service to be provided by the first network device to a subscribing entity.

13. A non-transitory machine-readable medium having instructions stored therein, which when executed by a processor, cause operations for managing operation of a distributed system to be performed, the operations comprising:

making, by a management controller of a first network device, an identification that a control plane of the first network device is suspected of being compromised;

obtaining, by the management controller and based on the identification, a test network policy based on a subscription that governs the first network device;

programming, by the management controller and using the test network policy, the control plane to obtain an updated control plane;

measuring, by the management controller and based on the test network policy and after the updated control plane has programmed a data plane of the first network device, a level of network service provided by the data plane and that is governed by the test network policy;

making a first determination regarding whether the level of network service is commensurate with the subscription;

in a first instance of the first determination where the level of network service is not commensurate with the subscription:

performing, by the management controller, an enforcement action to update operation of the data plane based on the subscription to obtain an updated data plane; and providing, by the first network device, network data unit processing services using the updated data plane.

14. The non-transitory machine-readable medium of claim 13, wherein measuring the level of network service comprises:

initiating, by the management controller, remote monitoring of the level of network service provided by the first network device by a remote device; and obtaining, by the management controller, a report of the level of network service provided by the first network device by the remote device.

15. The non-transitory machine-readable medium of claim 14, wherein initiating the remote monitoring comprises:

generating, by the management controller, a disguised network data unit comprising a payload requesting that remote monitoring be initiated by a second management controller of a second network device; and injecting, by the management controller, the disguised network data unit into a network data processing pipeline of the data plane.

16. The non-transitory machine-readable medium of claim 15, wherein the report of the level of network service is obtained via at least a second disguised network data unit from the second management controller.

17. A device, comprising:

a processor; and a memory coupled to the processor to store instructions, which when executed by the processor, cause operations for managing operation of a distributed system to be performed, the operations comprising:

making, by a management controller of a first network device, an identification that a control plane of the first network device is suspected of being compromised;

obtaining, by the management controller and based on the identification, a test network policy based on a subscription that governs the first network device;

programming, by the management controller and using the test network policy, the control plane to obtain an updated control plane;

measuring, by the management controller and based on the test network policy and after the updated control plane has programmed a data plane of the first network device, a level of network service provided by the data plane and that is governed by the test network policy;

making a first determination regarding whether the level of network service is commensurate with the subscription;

in a first instance of the first determination where the level of network service is not commensurate with the subscription:

performing, by the management controller, an enforcement action to update operation of the data plane based on the subscription to obtain an updated data plane; and providing, by the first network device, network data unit processing services using the updated data plane.

18. The device of claim 17, wherein measuring the level of network service comprises:

initiating, by the management controller, remote monitoring of the level of network service provided by the first network device by a remote device; and obtaining, by the management controller, a report of the level of network service provided by the first network device by the remote device.

19. The device of claim 18, wherein initiating the remote monitoring comprises:

generating, by the management controller, a disguised network data unit comprising a payload requesting that remote monitoring be initiated by a second management controller of a second network device; and injecting, by the management controller, the disguised network data unit into a network data processing pipeline of the data plane.

20. The device of claim 19, wherein the report of the level of network service is obtained via at least a second disguised network data unit from the second management controller.

\* \* \* \* \*